United States Patent
Moore et al.

(10) Patent No.: US 7,389,333 B2
(45) Date of Patent: Jun. 17, 2008

(54) PROVISIONING A NETWORK ELEMENT USING CUSTOM DEFAULTS

(75) Inventors: Francois G. Moore, McKinney, TX (US); Kenneth A. Morris, Fairview, TX (US)

(73) Assignee: Fujitsu Limited, Kawasaki (JP)

( * ) Notice: Subject to any disclaimer, the term of this patent is extended or adjusted under 35 U.S.C. 154(b) by 815 days.

(21) Appl. No.: 10/612,382

(22) Filed: Jul. 2, 2003

(65) Prior Publication Data

US 2005/0004999 A1    Jan. 6, 2005

(51) Int. Cl.
*G06F 15/177*  (2006.01)

(52) U.S. Cl. ............... 709/221; 709/220; 709/222

(58) Field of Classification Search ........ 709/220–223, 709/251

See application file for complete search history.

(56) References Cited

U.S. PATENT DOCUMENTS

| | | | |
|---|---|---|---|
| 5,412,652 A | 5/1995 | Lu | 370/223 |
| 5,771,381 A * | 6/1998 | Jones et al. | 713/100 |
| 5,848,065 A | 12/1998 | Gorshe et al. | 370/376 |
| 6,137,800 A | 10/2000 | Wiley et al. | 370/395.51 |
| 6,470,018 B1 | 10/2002 | Wiley et al. | 370/396 |
| 6,671,271 B1 | 12/2003 | Takemura et al. | 370/352 |
| 6,707,789 B1 | 3/2004 | Arslan et al. | 370/218 |
| 6,717,953 B1 | 4/2004 | Heuer et al. | 370/466 |
| 6,823,376 B1 * | 11/2004 | George et al. | 709/221 |
| 2002/0004390 A1 * | 1/2002 | Cutaia et al. | 455/424 |
| 2002/0058516 A1 * | 5/2002 | Amin | 455/455 |
| 2002/0150079 A1 * | 10/2002 | Zabawskyj et al. | 370/351 |
| 2003/0167423 A1 * | 9/2003 | Murakami et al. | 714/38 |
| 2005/0120063 A1 * | 6/2005 | Koestler | 707/204 |

* cited by examiner

*Primary Examiner*—William Vaughn
*Assistant Examiner*—Mohamed Ibrahim
(74) *Attorney, Agent, or Firm*—Baker Botts L.L.P.

(57) ABSTRACT

A method for provisioning a network element is included where a custom default file and a standard default file are provided in a network element. The custom default file includes one or more default parameters of a same type, but having a different value from, corresponding default parameters in the standard default file. Service parameters are determined based on the default parameters of the standard default file as modified by overriding default parameters of the custom default file. The service is generated based on the service parameters.

27 Claims, 2 Drawing Sheets

PROVISIONING A NETWORK ELEMENT USING CUSTOM DEFAULTS

TECHNICAL FIELD

This disclosure relates generally to the field of data communications and more specifically to provisioning a network element using custom defaults.

BACKGROUND

Telecommunications systems, cable television systems, and data communications networks may use optical networks to rapidly convey large amounts of information between remote points. In an optical network, information is conveyed in the form of optical signals through optical fibers. Optical fibers comprise thin strands of glass capable of transmitting the signals over long distances with very low loss.

Optical networks may use network elements that provide telecommunications services at discrete points of the network. A network element includes software that provisions the network element and manages the telecommunications services based on standard defaults provisioned to the network element. The standard defaults are generally hard-coded at the network element and are typically set by the supplier of the equipment.

SUMMARY

A method and system for provisioning a network element using custom defaults are provided. Provisioning a network element may be performed based on a custom default file and a standard default file, where the custom default file may include parameter values that override those in the default file.

According to one embodiment, a method for provisioning a network element includes providing a custom default file and a standard default file in a network element. The custom default file includes one or more default parameters of a same type, but having a different value from, corresponding default parameters in the standard default file. Service parameters are determined based on the default parameters of the standard default file as modified by overriding default parameters of the custom default file. The service is generated based on the service parameters.

Certain embodiments may provide one or more technical advantages. A technical advantage of one embodiment may be the reduction of the cost and complexity of tracking network management software versions. More particularly, a softcoded custom default file may be provided to include default values that modify the standard defaults. Therefore, a custom version of network management hardware may not be needed, resulting in a generic version being supported.

Another technical advantage of an embodiment may be the elimination or reduction of manual adjustments of defaults at a network element. The standard defaults may be modified automatically based on a custom default file. Yet another technical advantage of an embodiment may be that alignment of defaults at an element management system may be facilitated. The network element may automatically forward to the element management system the custom default values included in the custom default file facilitating alignment of the defaults at the element management system with the defaults applied at the network element.

Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure and its features and advantages, reference is now made to the following description, taken in conjunction with the accompanying drawings, in which.

DETAILED DESCRIPTION OF THE DRAWINGS

Figure 1:
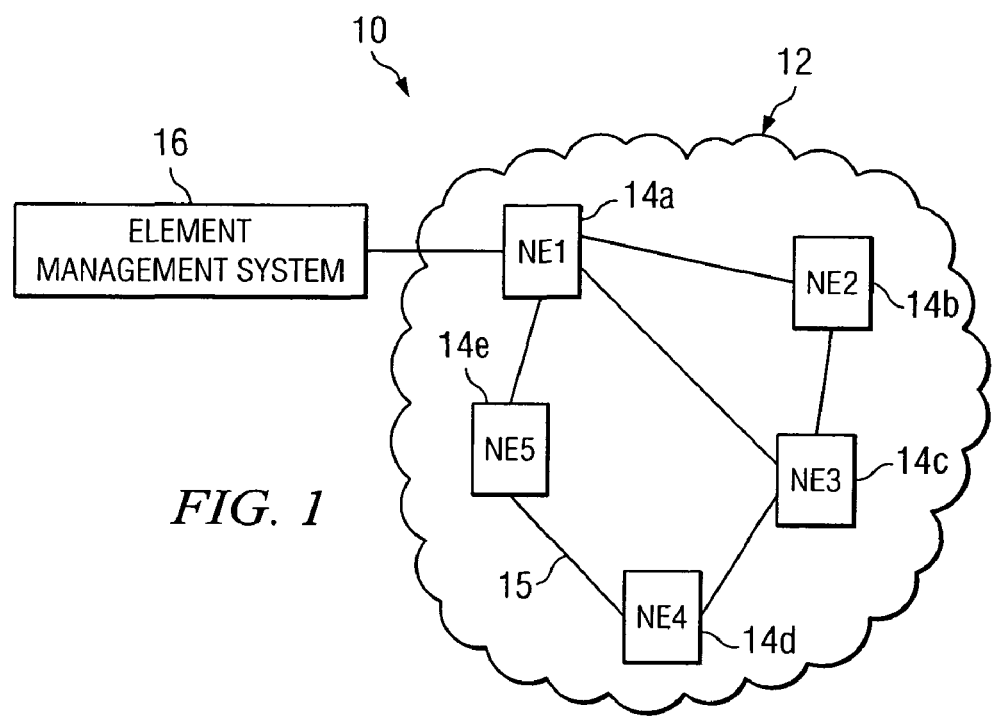
FIG. 1 is a block diagram of one embodiment of a telecommunications system including a plurality of network elements.

FIG. 1 is a block diagram of one embodiment of a telecommunications system 10 including a plurality of network elements. In this embodiment, system 10 is an optical communications system. System 10 may be, however, other suitable type of wireline, wireless system, or a combination of the preceding. The system 10 includes network element ring 12 having network elements 14a-14e. The network elements 14 may be configured in a mesh, partial mesh, linear, or other suitable configuration. Network elements 14a-14e are coupled to each other using an optical fiber 15. Traffic may flow through network element ring 12 and be added and/or dropped at network elements 14a-14e. System 10 also includes one or more element managers, in this embodiment an EMS 16. Although system 10 is illustrated as having one network element ring 12, system 10 may have, however, more rings 12 in a mesh network, which may include hundreds or thousands of network elements 14.

Element management system (EMS) 16 may comprise logic encoded in a media for performing network and/or node monitoring, providing access to surveillance, control, and security functions for specific managed sub-networks. Additionally, EMS 16 may perform alarm surveillance at the element level, monitor network element performance, perform software downloads, configure services, and ensure that network data is fully synchronized at system 10. Logic may comprise software encoded in a disk or other computer readable medium and/or instructions encoded in application specific integrated circuit (ASIC), field programmable gate array (FPGA), or other processor or hardware. It will be understood that the functionality of EMS 16 may be performed by a network management system (NMS), other components of system 10, and/or may be otherwise distributed or centralized.

According to the illustrated embodiment, EMS 16 is coupled to network element 14a-14e of network element ring 12 to perform the management functions of system 10. EMS 16, however, may be coupled to any number of network elements 14 of network element ring 12. For example, EMS 16 may be coupled to other network elements 14 of network element ring 12, other network elements 14 of other sub-networks, a NMS, or any other suitable element of system 10.

Network element, or node 14 includes logic encoded in a media for managing telecommunications services at the network element 14. For example, network element 14 manages local connections coupled to add/drop ports. Connections may be DS-0, DS-1/T1, DS-3/T3, synchronous, asynchronous, Ethernet-based, IP-based, or have any other suitable format or rate. Any other suitable entity may be managed by network element 14 without departing from the scope of the invention. In one embodiment, each managed entity is associated with service attributes that network element 14 may provision. For example, a DS-1 entity has attributes, such as frame format and line build-out, that network element 14 may provision using defaults that define the default value of the attributes. Standard defaults defined by a manufacturer and used for all carriers for the network element 14 may be hardcoded at the network element 14. It will be understood that network element 14 may manage any number of service entities to provide any suitable telecommunications services in system 10. Additionally, network element 14 may be provisioned with any suitable number of standard defaults.

As described in more detail below, network element 14 may include a softcoded custom default file that may modify or override conflicting standard defaults hardcoded at network element 14. According to one embodiment, network element 14 may be provided with a custom default file comprising default parameters of the same type as, but having different values from, the corresponding parameters in the standard default file. For example, network element 14 may include a parameter, such as frame format, for a DS1 set to a standard value, such as "superframe", which may be modified by a corresponding parameter value in the custom default file to set by it by default to "extended superframe." The custom default file may modify one or more default parameters in the standard default file and may be accessed by the software at network element 14 to automatically modify the standard defaults otherwise selected. The network element 14 allows, in one embodiment, a manufacturer to build one hardware platform for all customers and still provide custom defaults for each of them by including a software file.

In operation, network element 14 manages service entities that may be provisioned using standard defaults. The standard defaults may be modified using a custom default file that includes custom parameter values different from corresponding standard parameter values. Network element 14 may configure a service for an entity using both the standard defaults file and the custom defaults file and may create a service based on both defaults. EMS 16 may request the custom default file from network element 14 to manage the established service for that entity.

Modifications, additions, or omissions may be made to system 10 without departing from the scope of the invention. For example, more or fewer network elements 14 may be used at network element ring 12. As another example, EMS 16 may be coupled to a network management system (NMS) to provide an additional management layer at system 10. As used in this document, "each" refers to each member of a set or each member of a sub-set of a set. Additionally, functions may be performed using any suitable logic comprising software, hardware, other logic, or any suitable combination of the preceding.

A block diagram of one embodiment of a network element 14 that may be used with the optical communications system 10 of FIG. 1 is described with reference to FIG. 2. A block diagram of one embodiment of an element management system 16 that may be used with the optical communications system 10 of FIG. 1 is described with reference to FIG. 3.

A flowchart illustrating a method for provisioning a network element 14 using custom defaults is described with reference to FIG. 4.

Figure 2:
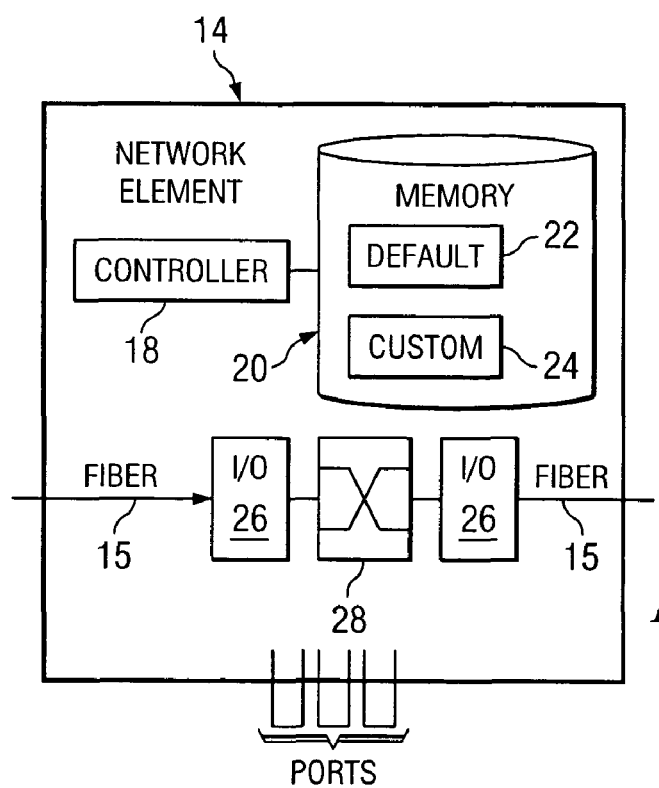
FIG. 2 is a block diagram of one embodiment of a network element that may be used with the optical communication system of FIG. 1.

FIG. 2 is a block diagram of one embodiment of a network element 14 that may be used with optical communications system 10 of FIG. 1. Network element 14 includes a controller 18, a memory 20, I/O cards 26, and a switch 28 coupled as shown in FIG. 2. In operation, a standard default file 22 and a custom default file 24 are stored at memory 20 which may be accessed by controller 18 to provision network element 14.

Controller 18 is coupled to memory 20 and operable to access standard default file 22 and custom default file 24. As was described with reference to FIG. 1, standard default file 22 includes standard defaults that may be preset by a manufacturer so that standard defaults among network elements 14 are uniform. Custom default file 24 includes custom parameter values that differ, in one embodiment, from those in the standard default file or that should be used if a there is a difference in values. For example, a DS1 entity may have a standard default set for a superframe frame format, where the custom default file may modify this parameter by setting a custom default for the frame format to be extended superframe.

Controller 18 reads the standard default file and the custom default file to establish a service corresponding to an entity being managed by network element 14. During setup or a reloading event controller 18 may perform a read sequence where custom default file 24 is accessed so the custom parameter values therein may be applied. In one embodiment, during initialization of a parameter at network element 14, the custom default value will be applied if there is a value for that parameter. Otherwise, the standard default parameter value is used.

Controller 18 may comprise any suitable logic comprising software, hardware, other logic, or any suitable combination of the preceding. For example, controller 18 may be an application layer of a software platform such as a FLASH-WAVE platform produced by FUJITSU.

Memory 20 stores standard default file 22 and custom default file 24. It will be understood, however, that memory 20 may include one or more memory modules, of same or disparate types, so that standard default file 22 may be stored in a separate module from custom default file 24. According to the illustrated embodiment, memory 20 comprises a non-volatile memory such as EEPROM, DRAMS, SRAMS, other suitable non-volatile memory modules, or none, all, or a combination of the preceding. Additionally, memory 20 may include any hardware suitable for storing a hardcoded standard default file. Any other suitable combination of softcoding and hardcoding, whether in one module, or several, may be used without departing from the scope of the present invention.

I/O cards 26 are coupled to fiber 15 to receive and transmit traffic to and from fiber 15. In one embodiment, I/O cards 26 may comprise optical to electrical interfaces (O/E) and electrical to optical interfaces (E/O), depending upon what port of network element 14 receives traffic from fiber 15 and what port forwards traffic to fiber 15. It will be understood however that I/O cards 26 may include any other suitable interface that may process receiving or transmit traffic to and from fiber 15. For example, I/O cards 26 may include SONET receivers and transmitters and/or any other components, cards, ports, or modules suitable for receiving or transmitting traffic to and from fiber 15. In one embodiment, I/O cards 26 may include local ports that support the services and handle the traffic at network element 14. In that embodiment, traffic added and/or dropped may be received and/or transmitted to and from the local ports of I/O cards 26 according to add/drop paths at network element 14. Fiber 15 may include two fibers, four fibers, or any other number of fibers suitable for managing traffic at network elements 14.

Switch 28 interfaces receive traffic and transmit traffic to and from I/O cards 26. According to the illustrated embodiment, switch 28 may include a multi-casting switch operable to receive a plurality of data channels to be routed to a plurality of output channels depending upon whether the data from those channels should be added or dropped. Switch 28 may be coupled to any suitable number of I/O cards 26. Additionally, network element 14 may include more or fewer I/O cards 26, and more or fewer switches 28.

Modifications, additions or omissions to network element 14 without departing from the scope of the invention. For example, I/O cards 26 may be modified to include SONET receivers and transmitters depending on the design of network element 14. As another example, additional memory modules 20 may be added to support additional functions, operations, and/or operations. As yet another example, network element 14 may include a user interface module that may enable local access to network element 14 using a user terminal. As yet another example, the custom default file 24 may be omitted so that network element 14 may be provided with only a custom default file 22 to provision the network element 14.

Figure 3:
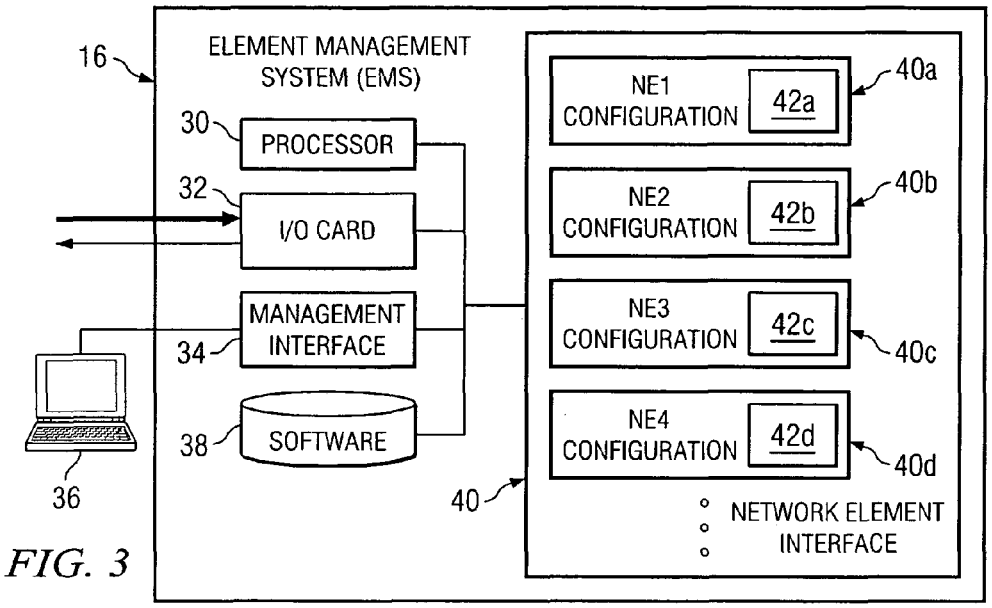
FIG. 3 is a block diagram of one embodiment of an element management system that may be used with the optical communication system of FIG. 1.

FIG. 3 is a block diagram of one embodiment of an element management system (EMS) 16 that may be used with the optical communications system 10 of FIG. 1. EMS 16 includes a processor 30, an I/O card 32, a management interface 34, a software platform 38, and a network element interface 40 coupled as shown in FIG. 3.

Processor 30 executes instructions included in software 38. In one embodiment, software 38 may include an application layer operable to manage network elements 14. It will be understood that software 38 may include any suitable number and type of application layers. For example, software 38 may include an element management software layer to manage network elements originating from a particular vendor such as FUJITSU. Additionally, software 38 may include other application layers to manage multiple vendor equipment, such as the OSMINE system produced by Telcordia.

Software 38 may interface with management interface 34 for alignment of defaults. In one embodiment, management interface 34 interfaces a user terminal with EMS 16 so that the user terminal may be able to, locally or remotely, access EMS 16 to manage network elements 14 of system 10. User interface 36 may include software for managing network elements to align EMS 16 with a configuration of each network element 14, all application layers running at EMS 16 may be aligned to reflect the standard defaults and custom defaults as applied at each network element 14. For example, network element 14a may be provisioned in a specific configuration based on the standard defaults and custom defaults so that the software platforms of software 38 and user interface 36 may reflect the particular configuration for network element 14a. EMS 16 may include any suitable number of software platforms at software 38, user interface 36, and/or any other module at EMS 16.

Software 38 may include a command that may cause network element 14 to forward the custom default file to EMS 16. According to the illustrated embodiment, the command may comprise a retrieve default command that requests the custom default file 24 from each network element 14. In one embodiment, software 38 is equipped with a TL-1 command such as RTRV-DEFAULT that may be used by EMS 16 to request custom default file 24 from each network element 14 of system 10. Based on the received custom default file 24, processor 30 may execute instructions of software 38 and/or user interface 36 to generate network element configuration files at network element interface 40. In response to the retrieve default command, network element 14 may automatically upload custom default file 24. Network element 14 may, however, send the custom defaults independently or in group batches rather forwarding a copy of custom default file 24. In another embodiment, network element 14 may send other parameters or attributes, such as service parameters or attributes built from the default files.

Network element interface 40 includes a network element configuration file for each network element 14 at system 10. For example, network element configuration 40a corresponds to the provisioned defaults set at network element 14a. Similarly, network element configuration 40b corresponds to the provisioned defaults set at network element 14b.

Network element interface 40 interfaces with processor 30 and software 38 and/or user interface 36 to ensure alignment of defaults at system 10. In one embodiment, network element interface 40 includes a network element configuration 40a comprising provisioned defaults 42a that may be supplied to software 38 and/or user interface 36 to ensure that the provisioned defaults of network elements 14 are aligned with the defaults EMS 16 uses to manage network elements 14. For example, network element configuration 40a includes provisioned defaults 42a that correspond to the defaults provisioned at network element 14a based on the standard default file 22 and custom default file 24. Similarly, provisioned defaults 42b correspond to the defaults provisioned at network element 14b based on standard default file 22 and custom default file 24 for that network element 14b. Network element interface 40 may include a network element configuration 40 and provisioned defaults 42a for each network element 14 of system 10. It will be understood, however, that network element configurations 40 and provisioned defaults 42 may be provided to EMS 16 at network element interface 40, software 38, user interface 36, and/or any other additional module at EMS 16 suitable for accessing and applying provisioned defaults 42 at EMS 16.

Based on the provisioned defaults 42, EMS 16 may monitor the telecommunications services established at network elements 14. The telecommunications services may be based at least in part to the service created at network element 14 according to the standard defaults 22 and custom defaults 24. EMS 16 may request the custom default file 24 from any network element 14 of system 10 at any time. More particularly, EMS 16 may request the custom default file 24 when a reloading event has occurred. According to one embodiment, a reloading event may include a power up sequence, a processor restart, a software download, and/or a software upgrade. It will be understood, however, that any other suitable reloading event may trigger the request of the custom default file 24 by EMS 16.

Modifications, additions, or omissions may be made to system 10 without departing from the scope of the invention. For example, management interface 34 may be omitted. As another example, additional software modules 38 may be included to represent additional software platforms running at EMS 16. Additionally, functions may be performed using any suitable logic comprising software, hardware, other logic, or any suitable combination of the preceding.

Figure 4:
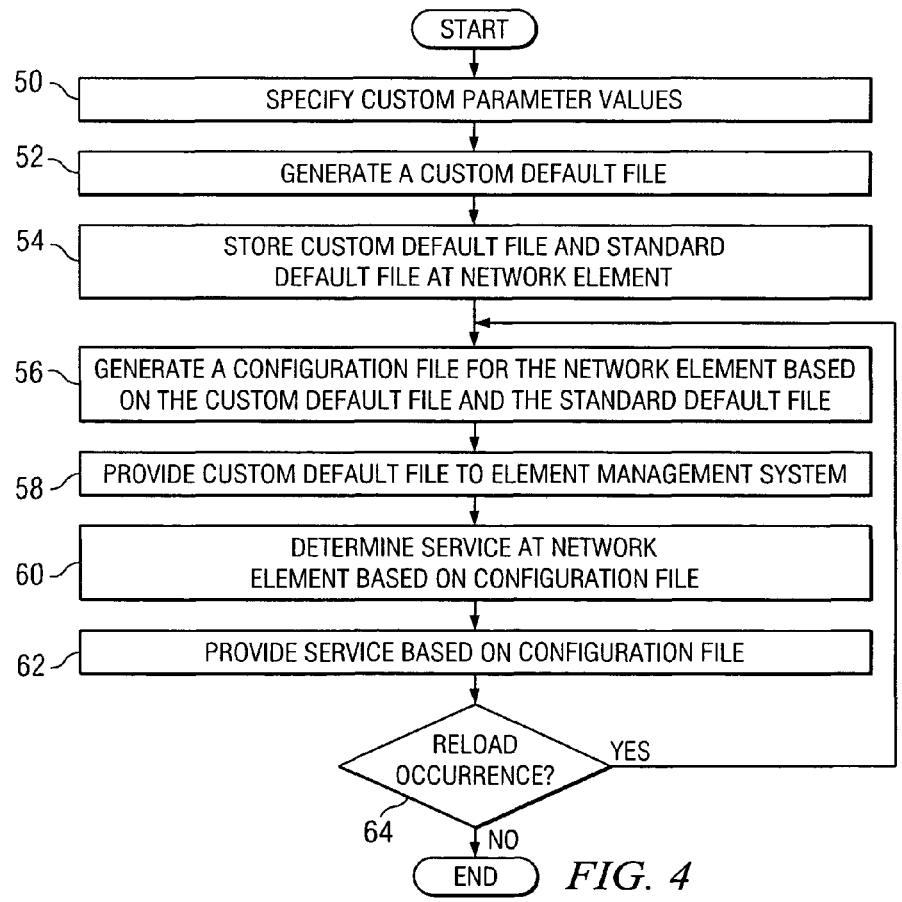
FIG. 4 is a flowchart illustrating a method for provisioning a network element using custom defaults.

FIG. 4 is a flowchart illustrating a method for provisioning network element 14 using custom defaults. The method begins at step 50 where custom parameter values are specified. In one embodiment, custom parameter values may comprise those parameter values that differ from the standard parameter values included in the standard defaults of the network element 14. The custom parameter values may be specified according to how the network element 14 will operate in system 10. For example, using the frame format parameter for a DS1 entity, the standard default value of "superframe" may be modified to a custom parameter value of "extended superframe".

In one embodiment, custom parameter values may be set for some, none, or all of the standard default values preset for a given network element 14. Referring to Tables 1 and 2 below, the following standard parameter values may be preset at a network element 14, which may be modified with custom parameter values selected from the values associated for each parameter. Additional standard parameters or defaults may be applied and modified without departing from the scope of the invention. Other standard parameters and their corresponding values not specifically referred to in Tables 1 and 2 may be used. These are presented as examples and should not be construed to limit the scope of the present invention to any of the listed or any other particular parameter.

TABLE 1

Threshold driven parameters

| Category | Parameters | | Available Values-15 Minutes (THLEV) | 15 MINUTE STANDARD DEFAULT (THLEV) |
|---|---|---|---|---|
| TL-1 Command | MONTYPE | CVL | 1–16383 | 387 |
| Category: Set | | ESL | 1–900 | 25 |
| Threshold T1 | | SESL | 1–900 | 4 |
| SET-TH- | | CVP | 1–6383 | 382 |
| T1:TID:AID:CTAG::: | | ESP | 1–900 | 25 |
| MONTYPE, THLEV, | | SASP | 1–900 | 2 |
| LOCN, DIRN:TMPER::; | | SESP | 1–900 | 4 |
| | | UASP | 1–900 | 10 |
| | | SEFSP | 1–900 | 2 |
| | LOCN | | NEND null | NEND |
| | DIRN | | RCV TRMT ALL null | ALL |
| TL-1 Command | MONTYPE | CVL | 1–16383 | 387 |
| Category: Set | | ESL | 1–900 | 25 |
| Threshold T3 | | SESL | 1–900 | 4 |
| SET-TH- | | CVP | 1–6383 | 382 |
| T3:TID:AID:CTAG::: | | ESP | 1–900 | 25 |
| MONTYPE, THLEV, | | SASP | 1–900 | 2 |
| LOCN, DIRN:TMPER::; | | SESP | 1–900 | 4 |
| | | UASP | 1–900 | 10 |
| | LOCN | | NEND null | NEND |
| | DIRN | | RCV TRMT ALL null | ALL |
| TL-1 Command | MONTYPE | CVL | 1–16383 | 387 |
| Category: Set | | ESL | 1–900 | 25 |
| Threshold EC1 | | SESL | 1–900 | 4 |
| SET-TH- | | UASL | 1–900 | 4 |
| EC1:TID:AID:CTAG::: | LOCN | | NEND null | NEND |
| MONTYPE, THLEV, | | | | |
| LOCN, DIRN:; | DIRN | | RCV TRMT ALL null | ALL |
| TL-1 Command | MONTYPE | CVS | 1–16383 | 382 |
| Category: Set | | ESS | 1–900 | 25 |
| Threshold OC-n | | SESS | 1–900 | 4 |
| SET-TH- | | SEFSS | 1–900 | 2 |
| xxx:TID:AID:CTAG::: | | CVL | 1–16383 (OC-3) | 1146 (OC-3) |
| MONTYPE, THLEV, | | | 1–196596 (OC-12) | 4584 (OC-12) |
| LOCN, DIRN: | | | 1–786384 (OC-48) | 18336 (OC-48) |
| TMPER::; | | | 1–786384 (OC-192) | 73344 (OC-192) |
| Supported entities (xxx): OC-3, OC-12, OC-48, OC-192 | | ESL | 1–900 | 25 |
| | | SESL | 1–900 | 4 |
| | | UASL | 1–900 | 4 |
| | LOCN | | NEND null | NEND |
| | DIRN | | RCV | ALL |

TABLE 1-continued

Threshold driven parameters

| Category | Parameters | | Available Values-15 Minutes (THLEV) | 15 MINUTE STANDARD DEFAULT (THLEV) |
|---|---|---|---|---|
| TL-1 Command Category: Set Threshold STS-1 SET-TH-STS1:TID:AID:CTAG::: MONTYPE, THLEV, LOCN, DIRN: TMPER::; | MONTYPE | CVP ESP SESP UASP | TRMT ALL null 1–16383 1–900 1–900 1–900 | 15 12 3 10 |
| | LOCN | | NEND null | NEND |
| | DIRN | | RCV TRMT ALL null | ALL |
| TL-1 Command Category: Set Threshold STS-nC SET-TH-xxx:TID:AID:CTAG::: MONTYPE, THLEV, LOCN, DIRN: TMPER::; Supported entities (xxx): STS-3C, STS-12C, STS-48C | MONTYPE | CVP ESP | 1–16383 1–900 | 25 (STS-3c) 75 (STS-12c) 125 (STS-48c) 20 (STS-3c) 60 (STS-12c) 100 (STS-48c) |
| | LOCN | | NEND null | NEND |
| | DIRN | | RCV TRMT ALL null | ALL |

TABLE 2

Non Threshold parameters

| Category | Parameters | Available Values | Standard Defaults |
|---|---|---|---|
| TL-1 Command Category: Allow & Inhibit Monitoring INH-PMREPT-xxx:TID:AID:CTAG::TMPER::; ALW-PMREPT-xxx:TID:AID:CTAG::TMPER::; Supported Entities (xxx) ALL, T1, T3, EC1, OC-3, OC-12, OC-48, OC-192, STS-1, STS-3C, STS-12C, STS-48C, T1CLK, VT1 | TMPER | 15-MIN 1-DAY ALL null | null |
| TL-1 Command Category: Allow & Inhibit COMM Monitoring ALW-REPT-COM:TID:AID:CTAG::MONTYPE::; INH-REPT-COM:TID:AID:CTAG::MONTYPE::; | MONTYPE | OSINOS | None |
| TL-1 Command Category: Initialize Monitoring INIT-REG-xxx:TID:AID:CTAG::MONTYPE, VALUE, LOCN, DIRN, TMPER,,, INDEX::; Supported entities (xxx): T1, T3, EC1, OC-3, OC-12, OC-48, OC-192, STS-1, STS-3C, STS-12C, STS-48C, T1CLK, VT1 | TMPER | 15-MIN 1-DAY ALL null | 15-MIN |
| TL-1 Command Category: Set Threshold T1 Clock SET-TH-T1CLK:TID:AID:CTAG::: MONTYPE, THLEV, LOCN, | CVL ESL SESL | 1...16383 1...900 1...900 | 13340 65 10 |

TABLE 2-continued

Non Threshold parameters

| Category | Parameters | Available Values | Standard Defaults |
|---|---|---|---|
| DIRN:; | | | |
| TL-1 Command Category: | ADT | 0 | 10 |
| Edit System | | 10 | |
| ED-SYS:TID::CTAG:::KEYWORD = DOMAIN:; | | | |
| TL-1 Command Category: | STATE | IS | OOS |
| Enter Ethernet | | OOS | |
| ENT- | | AINS | |
| EPORT:TID:AID:CTAG::: | | null | |
| KEYWORD = DOMAIN:STATE; | | | |
| TL-1 Command Category: | STATE | IS | OOS |
| Edit Ethernet | | OOS | |
| ED- | | AINS | |
| EPORT:TID:AID:CTAG::: | | null | |
| KEYWORD = DOMAIN:STATE; | | | |
| TL-1 Command Category: | AID | EXTCLKINP | None |
| Enter Clock | | EXTCLKINS | |
| ENT- | | EXTCLKOUTP | |
| T1CLK:TID:AID:CTAG::: | | EXTCLKOUTS | |
| KEYWORD = DOMAIN:STATE; | AISTHQL | PRS | ST3 |
| | | PRSB | |
| | | STU | |
| | | STUB | |
| | | ST2 | |
| | | ST2B | |
| | | ST3 | |
| TL-1 Command Category: | AISTHQL | PRS | ST3 |
| Edit Clock | | PRSB | |
| ED- | | STU | |
| T1CLK:TID:AID:CTAG::: | | STUB | |
| KEYWORD = DOMAIN:STATE; | | ST2 | |
| | | ST2B | |
| | | ST3 | |

At step 52 a custom default file 24 is generated for network element 14. Custom default file 24 includes the custom parameter value specified at step 50. Although the custom default file 24 has been described as containing only those parameter values that differ from standard default file 22, custom default file 24 may include any other suitable parameter value. For example, custom default file 24 may include all standard parameters and their corresponding values regardless of whether the values are standard or custom.

The method proceeds to step 54, where the standard default file 22 and custom default file 24 are stored at network element 14. As was described with reference to FIG. 2, custom default file 24 is stored at memory 20 in a non-volatile memory, while standard default file 22 is hardcoded in memory 20, other memory of network element 14, or otherwise provided for in hardware. Standard default file 22 and custom default file 24, however, may be stored in substantially the same memory module, or different memory modules 20 without departing from the scope of the invention.

At step 56, a configuration file may be generated for network element 14 based on the custom default file 24 and standard default file 22. In one embodiment, the configuration file may include the standard parameter values and the custom parameter values that may be used to provision network element 14. It will be understood, however, that the configuration file may be modified to include service parameters for a service to be provided based on the default parameters of the standard default file as modified by overriding default parameters of the custom default file.

At step 58, network element 14 provides custom default file 24 to EMS 16. As was described with reference to FIG. 3, EMS 16 may request from network element 14 the custom default file 24 using a retrieve default command. Network element 14, in response to the retrieve default command, may forward to EMS 16 the custom default file 24. Custom default file 24 may be forwarded either partially, or in its entirety, parsed, interleaved, compressed, or uncompressed, or in any other suitable format that EMS 16 may be operable to receive.

The method proceeds to step 60, where network element 14 determines a service based on the configuration file. Network element 14 reads the custom default file 24 to determine the attributes of the service that differ from those attributes set in the standard default file 22. For example, network element 14 determines that for a DS1 service, the standard default for a framing format has been modified by a custom parameter value set to "extended superframe" instead of the standard default specified as "superframe". Once the network element 14 has determined a service, the method proceeds to step 62, where network element 14 provides the service based on the configuration file.

At step 64, the method determines if a reloading event has occurred. A reloading event may include any suitable event such as power up sequence, processor restart, a software down load, a software upgrade, some, none, or all of the preceding. If a reloading event has occurred at step 64, the method returns to step 56 to generate a configuration file for network element 14 based on custom default file 24 and standard default file 22. Controller 18 of network element 14 may access the custom default file 24 and generate the configuration file to modify the standard parameter values of standard default file 22 according to the custom parameter values specified at custom default file 24. If a reloading event does not occur at step 64, the method terminates.

Steps may be added, omitted, modified, or performed in any suitable order without departing from the scope of the invention. For example, determining a service at network element 14 based on the configuration file at step 60 may be performed substantially simultaneously with providing a service based on the configuration file at step 62. As another example, storing custom default file 24 and a standard default file 22 at step 54 may be modified to include storing custom default file 24 at a non-volatile memory module 20 of network element 14. As yet another example, generating a configuration file for network element at step 56 may be modified to include generating a configuration for network element 14 by controller 18 executing software instructions that may reside at any module of network element 14.

Certain embodiments may provide one or more technical advantages. A technical advantage of one embodiment may be the reduction of the cost and complexity of tracking network management software versions. More particularly, a softcoded custom default file may be provided to include custom parameter values that modify the standard defaults. Therefore, a custom version of a network management hardware may not be needed, resulting in a generic version being supported.

Another technical advantage of an embodiment may be the elimination or reduction of manual adjustments of defaults at a network element. The standard defaults may be modified automatically based on a custom default file. Yet another technical advantage of an embodiment may be that alignment of defaults at an element management system may be facilitated. The network element may automatically forward to the element management system the custom parameter values included in the custom default file facilitating alignment of the defaults at the element management system with the defaults applied at the network element.

Although an embodiment of the invention and its advantages are described in detail, a person skilled in the art could make various alterations, additions, and omissions without departing from the spirit and scope of the present invention as defined by the appended claims.

What is claimed is:

1. A method for provisioning a network element, comprising:
   providing a custom default file and a standard default file in a network element, the standard default file including uniform default parameters preset by a manufacturer of the network element, the custom default file comprising one or more default parameters of a same type as, but having a different value from, corresponding default parameters in the standard default file, wherein the default parameters are associated with commands used to provision the network element for a telecommunications service and wherein the default parameters of the custom default file are non-uniform parameters specific to a particular customer to which the network element is provided and are provided to the customer by the manufacturer with the network element;
   wherein the custom default file comprising default parameters of a type selected from a group consisting of threshold driven parameters and non-threshold parameters, the threshold driven parameters comprising a set of thresholds for a plurality of communication types, the non-threshold parameters comprising parameters associated with a category selected from a group consisting of allow and inhibit monitoring category, allow and inhibit COMM monitoring category, initialize monitoring category, set threshold T1 clock category, edit system category, enter ethernet category, edit ethernet category, enter clock category, and edit clock category:
   determining service parameters for the telecommunications service based on the uniform default parameters of the standard default file as modified by overriding default parameters of the custom default file that are specific to the particular customer;
   creating a configuration file that includes service parameters for the telecommunications service to be provided based on the default parameters of the standard default file as modified by overriding default parameters of the custom default file; and
   establishing the telecommunications service based on the service parameters included in the configuration file.

2. The method of claim 1, further comprising re-determining the service parameters for the service in response to a reloading event by:
   re-determining the service parameters for the service based on the default parameters of the standard default file as modified by overriding default parameters of the custom default file; and
   re-establishing the service based on the service parameters.

3. The method of claim 2, wherein the reloading event comprises an event selected from the group consisting of a power-up sequence, a processor restart, a software download, and a software upgrade.

4. The method of claim 1, wherein the custom default file and the standard default file are stored in disparate types of memory.

5. The method of claim 4, wherein the standard default file is hardcoded in hardware.

6. The method of claim 4, wherein the custom default file is stored as software.

7. The method of claim 1, further comprising:
   receiving a retrieve default command of an element manager requesting the default parameters of the custom default file; and
   forwarding the one or more default parameters of the custom default file to the element manager in response to the retrieve default command.

8. The method of claim 1, wherein providing the custom default file further comprises storing the custom default file in a non-volatile memory of the network element.

9. The method of claim 1, wherein the non-threshold parameters comprise parameters associated with a category selected from a group consisting of allow and inhibit monitoring category, allow and inhibit COMM monitoring category, initialize monitoring category, set threshold T1 clock category, edit system category, enter ethernet category, edit ethernet category, enter clock category, and edit clock category.

10. A network element, comprising:
    a memory comprising a custom default file and a standard default file, the standard default file including uniform default parameters preset by a manufacturer of the network element, the custom default file comprising one or more default parameters of a same type as, but having a different value from, corresponding default parameters in the standard default file, wherein the default parameters are associated with commands used to provision the network element for a telecommunications service and wherein the default parameters of the custom default file are non-uniform parameters specific to a particular customer to which the network element is provided and are provided to the customer by the manufacturer with the network element;

wherein the custom default file comprising default parameters of a type selected from a group consisting of threshold driven parameters and non-threshold parameters, the threshold driven parameters comprising a set of thresholds for a plurality of communication types, the non-threshold parameters comprising parameters associated with a category selected from a group consisting of allow and inhibit monitoring category, allow and inhibit COMM monitoring category, initialize monitoring category, set threshold T1 clock category, edit system category, enter ethernet category, edit ethernet category, enter clock category, and edit clock category; and a controller coupled to the memory and operable to:
  determine service parameters for the telecommunications service based on the uniform default parameters of the standard default file as modified by overriding default parameters of the custom default file that are specific to the particular customer;
  create a configuration file that includes service parameters for the telecommunications service to be provided based on the default parameters of the standard default file as modified by overriding default parameters of the custom default file; and
  establish the telecommunications service based on the service parameters included in the configuration file.

11. The network element of claim 10, wherein the controller is further operable to re-determine the service parameters for the service in response to a reloading event by:
  re-determining the service parameters for the service based on the default parameters of the standard default file as modified by overriding default parameters of the custom default file; and
  re-establishing the service based on the service parameters.

12. The network element of claim 11, wherein the reloading event comprises an event selected from the group consisting of a power-up sequence, a processor restart, a software download, and a software upgrade.

13. The network element of claim 10, wherein the controller is further operable to:
  receive a retrieve default command of an element manager requesting the default parameters of the custom default file; and
  forward the one or more default parameters of the custom default file to the element manager in response to the retrieve default command.

14. The network element of claim 10, wherein the memory comprises a non-volatile memory.

15. The network element of claim 10, wherein the custom default file and the standard default file are stored in disparate types of memory.

16. The network element of claim 10, wherein the standard default file is hardcoded in hardware.

17. The network element of claim 10, wherein the custom default file is stored as software.

18. Software stored on a computer-readable storage medium and operable to:
  access a custom default file and a standard default file in a network element, the standard default file including uniform default parameters preset by a manufacturer of the network element, the custom default file comprising one or more default parameters of a same type as, but having a different value from, corresponding default parameters in the standard default file, wherein the default parameters are associated with commands used to provision the network element for a telecommunications service and wherein the default parameters of the custom default file are non-uniform parameters specific to a particular customer to which the network element is provided and are provided to the customer by the manufacturer with the network element;

wherein the custom default file comprising default parameters of a type selected from a group consisting of threshold driven parameters and non-threshold parameters, the threshold driven parameters comprising a set of thresholds for a plurality of communication types, the non-threshold parameters comprising parameters associated with a category selected from a group consisting of allow and inhibit monitoring category, allow and inhibit COMM monitoring category, initialize monitoring category, set threshold T1 clock category, edit system category, enter ethernet category, edit ethernet category, enter clock category, and edit clock category;

determine service parameters for the telecommunications service based on the uniform default parameters of the standard default file as modified by overriding default parameters of the custom default file that are specific to the particular customer;

create a configuration file that includes service parameters for the telecommunications service to be provided based on the default parameters of the standard default file as modified by overriding default parameters of the custom default file; and establish the telecommunications service based on the service parameters included in the configuration file.

19. The software of claim 18, further operable to re-determine the service parameters for the service in response to a reloading event by:
  re-determining the service parameters for the service based on the default parameters of the standard default file as modified by overriding default parameters of the custom default file; and
  re-establishing the service based on the service parameters.

20. The software of claim 19, wherein the reloading event comprises an event selected from the group consisting of a power-up sequence, a processor restart, a software download, and a software upgrade.

21. The software of claim 18, further operable to:
  detect a retrieve default command of an element manager requesting the default parameters of the custom default file; and
  forward the one or more default parameters of the custom default file to the element manager in response to the retrieve default command.

22. The software of claim 18, wherein the custom default file is stored in a non-volatile memory of the network element.

23. The software of claim 18, wherein the custom default file and the standard default file are stored in disparate types of memory.

24. The software of claim 18, wherein the standard default file is hardcoded in hardware.

25. The software of claim 18, wherein the custom default file is stored as software.

26. A method for provisioning a network element, comprising:
  means for providing a custom default file and a standard default file in a network element, the standard default file including uniform default parameters preset by a manufacturer of the network element, the custom default file comprising one or more default parameters of a same type as, but having a different value from, corresponding default parameters in the standard default file, wherein the default parameters are associated with commands used to provision the network element for a telecommunications service and wherein the default parameters of the custom default file are non-uniform parameters specific to a particular customer to which the network element is provided and are provided to the customer by the manufacturer with the network element;

wherein the custom default file comprising default parameters of a type selected from a group consisting of threshold driven parameters and non-threshold parameters, the threshold driven parameters comprising a set of thresholds for a plurality of communication types, the non-threshold parameters comprising parameters associated with a category selected from a group consisting of allow and inhibit monitoring category, allow and inhibit COMM monitoring category, initialize monitoring category, set threshold T1 clock category, edit system category, enter ethernet category, edit ethernet category, enter clock category, and edit clock category;

means for determining service parameters for the telecommunications service based on the uniform default parameters of the standard default file as modified by overriding default parameters of the custom default file that are specific to the particular customer;

means for creating a configuration file that includes service parameters for the telecommunications service to be provided based on the default parameters of the standard default file as modified by overriding default parameters of the custom default file; and means for establishing the telecommunications service based on the service parameters included in the configuration file.

27. A network element, comprising:

at least one memory comprising a custom default file and a standard default file, the standard default file including uniform default parameters preset by a manufacturer of the network element, the custom default file and the standard default file stored in disparate types of memory, the at least one memory comprising a non-volatile memory, the custom default file stored as software in the non-volatile memory, the standard default file hard-coded in hardware, the custom default file comprising one or more default parameters of a same type as, but having a different value from, corresponding default parameters in the standard default file, wherein the default parameters are associated with commands used to provision the network element for a telecommunications service and wherein the default parameters of the custom default file are non-uniform parameters specific to a particular customer to which the network element is provided and are provided to the customer by the manufacturer with the network element;

wherein the custom default file comprising default parameters of a type selected from a group consisting of threshold driven parameters and non-threshold parameters, the threshold driven parameters comprising a set of thresholds for a plurality of communication types, the non-threshold parameters comprising parameters associated with a category selected from a group consisting of allow and inhibit monitoring category, allow and inhibit COMM monitoring category, initialize monitoring category, set threshold T1 clock category, edit system category, enter ethernet category, edit ethernet category, enter clock category, and edit clock category; and a controller coupled to the memory and operable to:
  determine service parameters for the telecommunications service based on the uniform default parameters of the standard default file as modified by overriding default parameters of the custom default file that are specific to the particular customer;
  create a configuration file that includes service parameters for the telecommunications service to be provided based on the default parameters of the standard default file as modified by overriding default parameters of the custom default file;
  establish the service based on the service parameters included in the configuration file;
  receive a retrieve default command of an element manager requesting the default parameters of the custom default file; and forward the one or more default parameters of the custom default file to the element manager in response to the retrieve default command.

\* \* \* \* \*